United States Patent
Poss

[15] 3,704,956
[45] Dec. 5, 1972

[54] DEVICE FOR POSITIONING WORKPIECES IN A PRE-ESTABLISHED SEQUENCE OF MACHINING POSITIONS

[72] Inventor: Emilio Poss, Verbania, Italy
[73] Assignee: FIMI S.p.A., Milan, Italy
[22] Filed: Sept. 21, 1970
[21] Appl. No.: 73,815

[30] Foreign Application Priority Data

April 11, 1970 Italy..............................23176 A/70

[52] U.S. Cl....................408/91, 82/34 D, 29/65, 83/413
[51] Int. Cl. .............................................B23q 7/02
[58] Field of Search............408/91, 69, 70; 82/34 D; 29/65; 83/412, 413, 414

[56] References Cited

UNITED STATES PATENTS

3,233,485   2/1966   Creamer............................83/413 X
2,757,560   8/1956   Ridgway............................408/91 X Primary Examiner—Andrew R. Juhasz
Assistant Examiner—Z. R. Bilinsky
Attorney—McGlew and Toren

[57] ABSTRACT

A device for sequentially positioning a workpiece in respect of one or more tools according to a scheduled plurality of positions, said device comprising a movable assembly and a stationary assembly respectively connected to a workpiece and to the tool(s), or vice versa. The movable assembly comprises two oppositely directed and powered pushers movably operated in opposite directions along a straightpath, between a minimum spacing position and a maximum spacing position thereof, said pushers being operated by cylinder-piston assemblies rigidly connected to a worktable or the like slidingly movable in a direction parallel to said pusher path. The stationary assembly comprises a programming means adapted to successively bring a plurality of projections, having a length equal to said pusher minimum spacing, along said pusher path and between said pushers in their maximum spacing position, in order to carry-out a required worktable positioning step during a subsequent motion of said pushers to their minimum spacing position. The device comprises also a system of control, interlocking and consent means to ensure an accomplishment of said motions according to a pre-established operational sequence and without any inconsistent condition.

13 Claims, 10 Drawing Figures

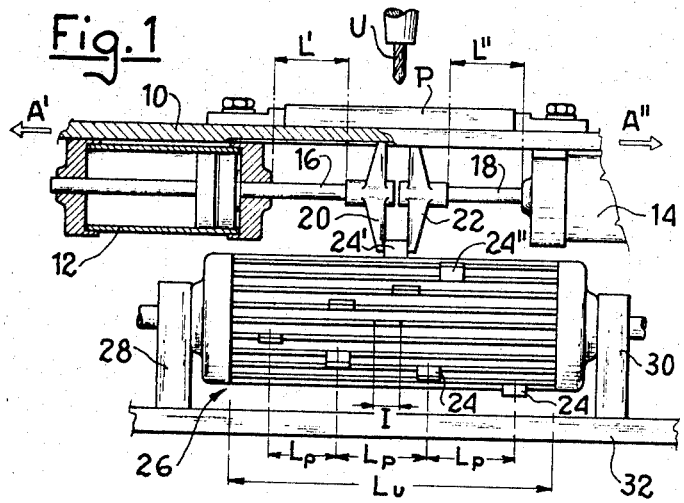
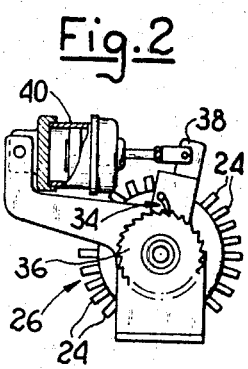
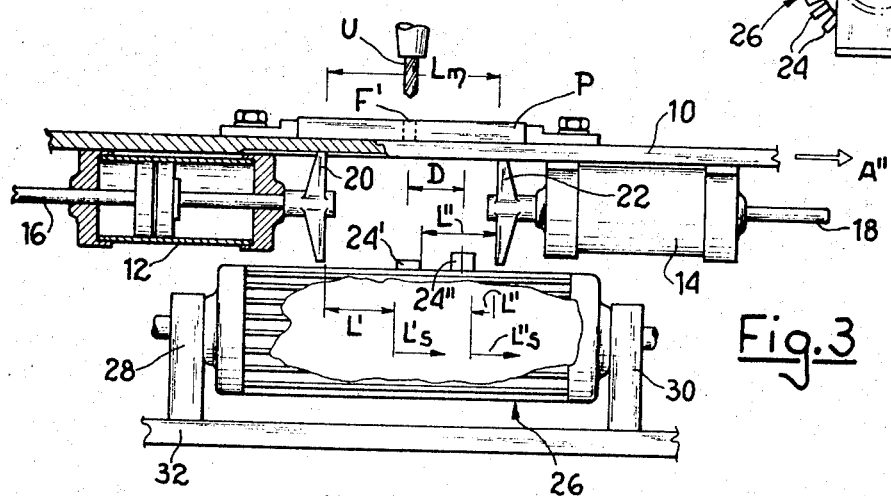
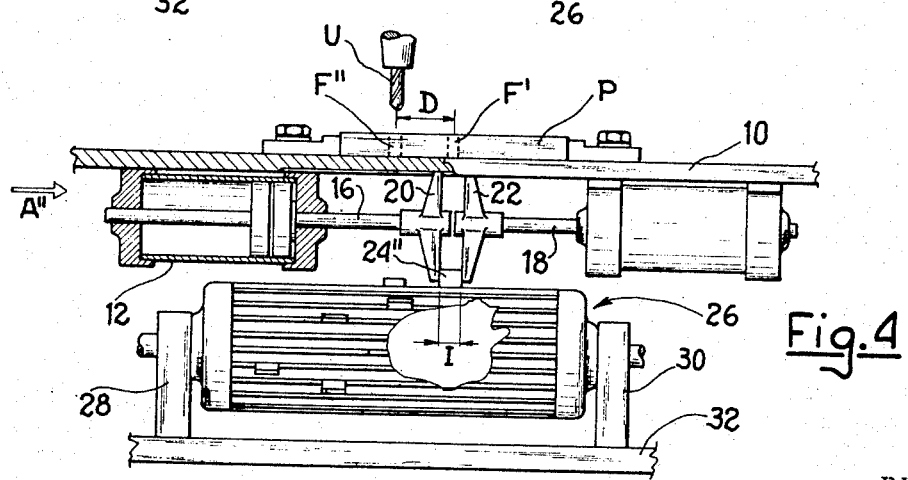

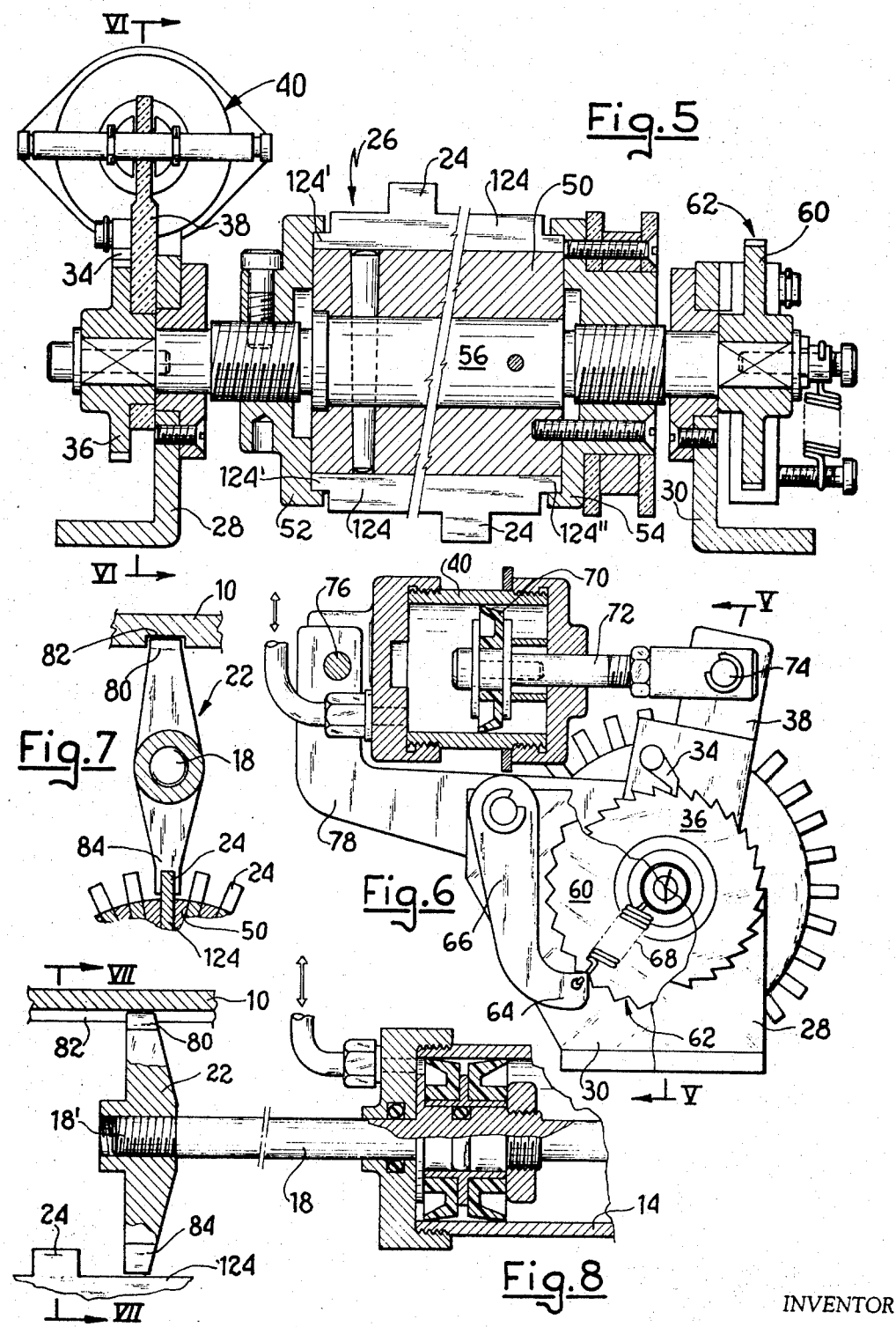

INVENTOR
EMILIO POSS
BY McGlew and Toren
ATTORNEY

DEVICE FOR POSITIONING WORKPIECES IN A PRE-ESTABLISHED SEQUENCE OF MACHINING POSITIONS

BACKGROUND OF THE INVENTION

This invention concerns an improved device by which a workpiece, to be machined in a plurality of positions, is automatically and sequentially moved and accurately positioned by means of one or more tools, according to a pre-established schedule, in each one of said positions for performing and fulfilling a machining cycle.

More particularly, this invention concerns a device by which a sequence of motions can be imparted to a worktable or other workpiece clamping device movably supported in at least one direction, in such a manner that a workpiece, clamped on said worktable or the like, at the end of each motion lies in one of a plurality of positions, in respect of tool or tools, wherein machining operations related to a pre-established schedule can be accomplished.

SUMMARY OF THE INVENTION

An object of this invention is to provide a sequentially positioning device, as stated above, comprising positioning means adapted to operate said worktable or the like in order to reach said scheduled, successive positions; programming means by which the different positions to be attained at the end of each motion are sequentially established; means to operate said programming means in order to prearrange the same, according to a corresponding sequence, in a plurality of conditions as required for establishing the successive positions to be reached by said workpiece under the action of said positioning means in accomplishing said machining schedule: and a system of control, interlocking and consent means to ensure that said operations of the above stated means can be sequentially accomplished according to a pre-established order and without any inconsistent condition.

According to another feature of this invention, said improved device comprises programming means designed in such a manner as to allow a ready and easy modification, alteration and change of schedule, for adapting said device, as well as the machine tool, to perform different schedules, comprising different workpiece positioning steps according to different operational sequences.

The device according to this invention comprises a set of means that form together an operating unit adapted to ensure automatic positioning motions of a workpiece in respect of a tool, according to a plurality of pre-established positions selected along a pre-established direction, and more precisely along a segment of a straight line by which said direction is defined. Obviously, two or more operating units as previously defined may be associated in such a manner as to individually operate along two or more directions, e.g. orthogonally directed, to perform programmed positioning motions in a plane. Operating units by which a workpiece can be positioned, according to a given program, through rotary motions about a pre-established axis or otherwise, can be similarly predisposed and utilized. At any rate, a plurality of assemblies are associated, each of which is able to meet, with suitable modifications the requirements of said operating unit, said association being able to interlock the actions and effects of each single unit by a composition of the different motions as resulting from the different unit actions. Owing to the above reasons, the invention is hereinafter described with reference to an illustrative embodiment thereof comprising a single operating unit.

Moreover, as previously stated, the device according to this invention is designed to position a workpiece in respect to one or more tools. Preferably the workpiece is moved, according to a given program, in respect of the tool, which is assumed to be in a spatial stationary position. However and according to this invention, the device may be obviously designed for positioning one of more tools. Similarly, as said positioning device comprises operative parts that are movable in respect of stationary structural parts, a few of the device components, as described later on, are obviously associated with movable and respectively stationary parts. Said associations, as specifically described later on, may be reversed without departing from the spirit and scope of this invention, since reversal does not modify the effects of required motion and relative positioning steps according to a pre-established program.

BRIEF DESCRIPTION OF THE DRAWINGS

FIG. 1 is a partially sectioned view of programming and positioning means of a programming device, with a few structural simplifications and in a workpiece positioning condition, FIG. 2 is a view showing operating means of the programming device, FIG. 3 and 4 are views of the assembly of FIG. 1 during and at the end, respectively, of a successive positioning operation, FIG. 5 is a detailed section taken on the plane V—V of FIG. 6, showing said programming device, having shortened axial size;

FIG. 6 is a view of said programming device operating means partly sectioned on the plane VI—VI of FIG. 5;

FIG. 7 is a fragmentary view, partly sectioned on the plane VII—VII of FIG. 8, of the one means to engage said positioning device with said programming device;

FIG. 8 is a fragmentary, detailed view of the positioning device components;

DESCRIPTION OF THE PREFERRED EMBODIMENTS

Figure 9:
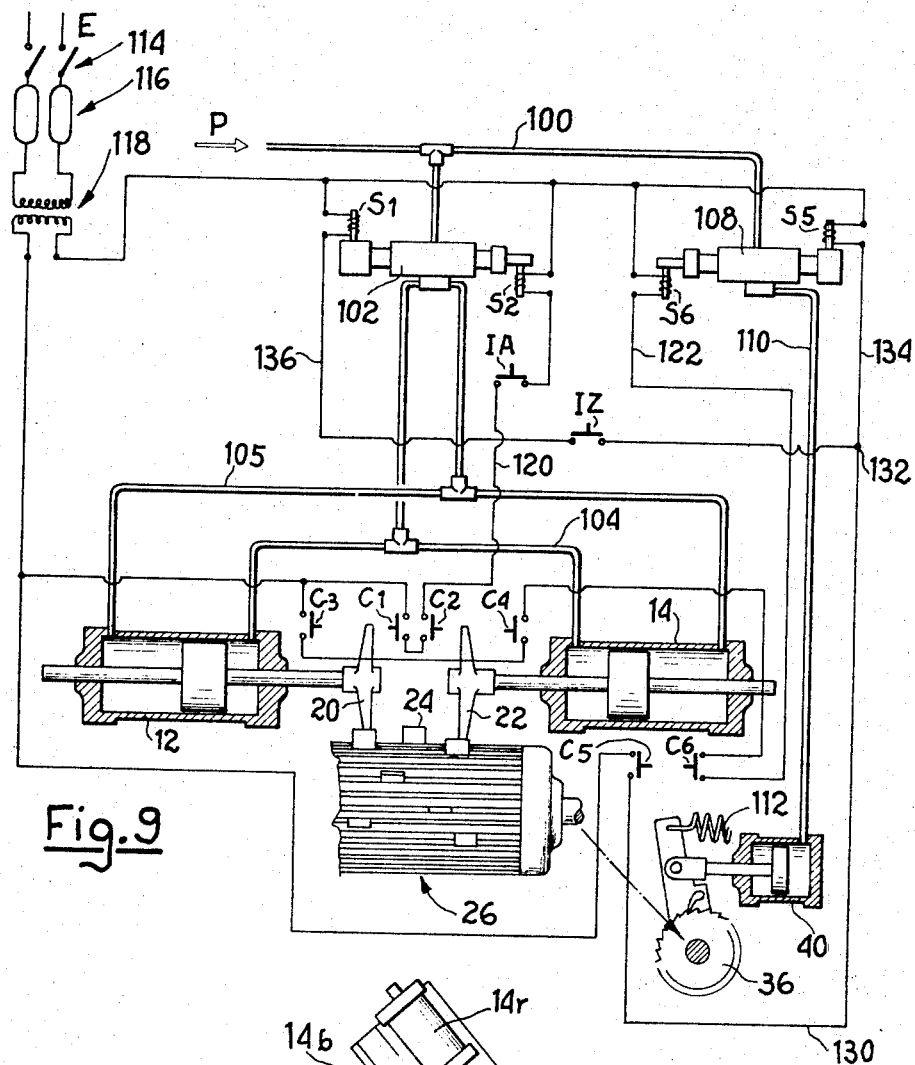
FIG. 9 is a diagrammatic view of the essential components of a preferred control, interlocking and consent system.

Referring firstly to FIGS. 1 to 4 inclusive, the device as shown is utilized for positioning a workpiece P, e.g. a plate, relative to a tool U, e.g. a drill, which is assumed to be clamped in a spatially stationary position and adapted to carry-out an axial feeding and return motion only, in addition to its rotary motion. The workpiece P is clamped in any known manner to any suitable structure, e.g. to a worktable 10 that is slidingly supported, e.g. by means of slides, for carrying out motions in a given direction (lying in the drawing plane), and in either senses A' and A". The workpiece P can be positioned in such a manner that the tool U operates on a plurality of required positions thereon, which can be selected along a straight line extending in said direction and cutting the tool axis. Obviously, different machining operations can be performed by providing different tools.

Two hydraulic or pneumatic cylinder-piston assemblies 12 and 14, located in a co-axial and symmetrically opposite relation-ship, are rigidly connected to the worktable 10. The double acting cylinder-piston assemblies, to which a pressure fluid is fed as hereinafter stated, are dimensioned and arranged in such a manner that strokes L' and L" each having an exactly pre-established length as defined by stop means, e.g. by their cylinder heads, are performed in opposite directions by piston rods 16 and 18, respectively. Fastened to the opposite ends of said piston rods 16 and 18 are shaped pushers 20 and 22 respectively, between which a maximum interval Lm (see FIG. 3) is formed when lying in their position of maximum return (outward end stroke) position, whilst a minimum interval I is left therebetween in the opposite end stroke position (i.e. of maximum feed). The abovedescribed components form a movable assembly, whose motion in either of directions A' or A" is utilized for successively positioning said workpiece P.

The positioning steps are controlled by a programming means, comprising a programming drum or roll 26, having an essentially cylindric configuration and revolvingly supported, e.g. between said frames 28 and 30, by a component 32 of the machine tool stationary structure. On suitable points across radially equidistant generatrices of said drum are formed a plurality of projections 24, which have a length in a direction parallel to drum axis and to said traverse direction of the table 10, which is equal to, or slightly greater (within narrow tolerance limits) than said minimum interval I, said projections being located in such a manner as to be successively brought (by successive rotations of narrow and equal angular width) to interfere with the paths of said pushers 20 and 22.

The drum 26, while being able to rotate about its axis, is axially retained between side frames 28 and 30, and therefore it is stationary with reference to worktable motions in A' and A" directions by which said positioning operations are carried-out.

The successive rotary motions are preferably imparted to drum 26 by means of a driving mechanism of the type shown in FIG. 2, which will be described in more detail later on. Such mechanism comprises a ratchet gear 34 engaging a sawtooth gear 36, each tooth of which corresponds to said angular width, said ratchet gear being fitted on a swinging arm 38 operated by a hydraulic or pneumatic cylinder-piston assembly 40 preferably of a single action type and kept under the action of resilient return means.

The performance of the improved device is apparent from what has been stated above. The required successive positioning steps can be suitably scheduled by arranging said projections 24 across the successive generatrices of drum 26, which is then advanced by one step or angular width at each machining cycle, in order to bring the next projection 24 between the pushers 20 and 22. The positioning operative sequence is as follows:

In FIG. 1 it has been assumed that the workpiece P was positioned for drilling a hole therein in a position F' as shown in FIG. 3. Such position is ensured by the fact that the projection 24' is clamped between the pushers 20 and 22, and is thus defined by the position of said projection 24' across the length of drum 26. Now, after drilling the hole F', a second hole is to be drilled in a position F" (see FIG. 4) leftwardly shifted and lying at a distance D from the previously drilled hole F'.

The new position is attained by following the hereinafter stated motion sequence:

a. Driving the pushers 20 and 22 away from one another at their maximum interval Lm (see FIG. 3) by means of said cylinder piston assemblies 12 and 14.

b. Turning the drum 26 by one step by means of said cylinder-piston assembly 40 and ratchet gear 34,36 in order to bring a new projection 24" in its operating position, said new projection 24" being rightwardly shifted by said distance D with reference to said previously positioning.

c. Driving the pushers to their minimum interval I by the action of said cylinder-piston assemblies 12 and 14 in opposite directions. At the end of said operation the workpiece P lies in said new, required position (see FIG. 4). Any new position may be attained, provided that the next projection 24" is brought between the pushers in a point within their maximum interval Lm. As exemplified in FIG. 3, when the two cylinder-piston assemblies 12 and 14 are operated, their pushers are forced to perform complete converging strokes L' and L". However, the pusher 22 is stopped by the projection 24" before reaching the end of its stroke L" and, as it meets a resistance that cannot be overcome, its forward motion to be left is converted in a backward motion of its cylinder-piston assembly 14 to the right, and consequently the whole movable assembly (worktable 10 with the workpiece P and the other cylinder-piston assembly 12) is moved in direction A" across the residual length L"s of pusher stroke, while the total motion to the right of the other pusher 20 corresponds to the sum of its own stroke L' relative to worktable 10 and of length L"s of a motion accomplished along with said table.

Obviously, the same conditions and operative sequences are carried-out in opposite directions when said shifting, as required for a next positioning step is to be performed to the left instead of to the right, the width of said shifting being always equal (but in an opposite direction) to the interval between the positions (in the direction of the drum axis) of projections 24 that are successively brought to interfere with the pusher paths.

From a consideration of FIGS. 1, 3 and 4 it can be noticed that said programming drum 26 has a useful axial length Lu far greater than the length of maximum interval Lm between the pushers (see FIG. 3). This allows to reach a wider extent of positions, though maintaining small cylinder and movable assembly sizes. This may be attained during the arrangement of projections 24 on the drum, i.e. when programming the machining operations, by maintaining any axial spacing between said projections that follow one another (during the drum rotation), always equal to a length Lp not greater than the strokes L' or L'' of said pushers. Otherwise stated: a shifting longer than said stroke, till to maximum useful limit Lu, shall be made by successive steps, individually not greater than a pusher stroke.

The above described components may be practically designed in many, different manners. As illustratively shown in FIGS. 5 to 8 inclusive, said programming drum 26 consists of a cylindric body 50, formed with a plurality of grooves all along generatrices thereof, wherein as many metal strips 124, each formed with a projection 24, can be engaged, said strips being fastened to said body 50 by crown shaped heads 52 and 54, adapted to encompass the opposite ends 124' and 124'' of said strips. The cylindric body is fitted on a shaft 56 in such a manner as to allow a large axial adjustment thereof, since the accuracy of tool positioning steps depends on such adjustment. By outwardly shifting said crown shaped heads and in particular the head 52, said strips 124 can be taken away from the cylindric body and replaced with different ones, for programming a different device schedule based on the position of projections 24 along the related strips.

Keyed at one end of said shaft 56 is a saw toothed wheel 36, that is engaged by a ratchet gear 34. Keyed on the opposite end of said shaft is a wheel 60, having slightly inclined teeth 62 wherein a pawl 64, carried by a swinging arm 66 that is kept under the action of a spring 68, is successively engaged in order to retain the drum in each angular operating position.

The cylinder-piston assembly 40 by which said drum is step-by-step turned and having a piston 70 connected to a swinging arm 38 of the ratchet gear by a short connecting rod 72 and an articulated joint 74, is preferably pivotally connected, as in 76, with an arm 78 of the device stationary frame.

As it can be noticed from the detail views of FIGS. 7 and 8 referring to the pusher 22 as driven by the cylinder-piston assembly 14 (the other pusher being symmetrically similar), said pusher is adjustably secured to the end 18' of the related piston rod 18 and is held against rotary motions about said rod axis by one end 80 thereof slidingly engaging a guide groove 82 that is formed on the worktable 10, or by any other suitable means. The opposite end 84 of said pusher, designed to abut the different positioning projections 24, is dimensioned and shaped in such a manner that, as it can be noticed from FIG. 7, it can engage only one projection at a time and freely sidewardly overtake all other preceding and subsequent positioning projections.

In order to automatically carry-out said sequence of motions for reaching any programmed position as well as said sequence of programmed positions, the above stated device, or equivalent thereof, may be associated with a system comprising electro-pneumatic or electro-hydraulic devices of the type diagrammatically shown in FIG. 9, wherein the essential device components are indicated by the same reference numerals of FIGS. 1 to 8 inclusive.

Such system is operatively connected to a source of electric power E and to a source of a pressure fluid P, e.g. compressed air. The compressed air inlet circuit 100 is connected with said double acting positioning cylinder-piston assemblies 12 and 14 by means of a flow distributor 102 having electrovalves S1 and S2, and flow distributor pipes 104 and 105, through which the two heads of each cylinder-piston assembly are fed in parallel alternatively connected with the pressure and discharge sides. The single acting cylinder-piston assembly 40 is fed through a flow distributor 108 having electrovalves S5 and S6, by means of which a feeding pipe 110 of said cylinder-piston assembly can be alternately connected with the pressure and discharge side, the piston return strokes being carried-out by a spring 112.

The electric circuit, comprising a main switch 114, fuses 116 and a transformer 118, energizes the windings of said electrovalves S1-S6 through a plurality of control, consent and follow-up switches, namely:

The attainment of forward and return end stroke positions of pushers 20 and 22 is revealed by end-stroke microswitches C1, C2, and C3, C4, respectively, being closed. The microswitches C1,C2 are series-connected with one another and with a starting switch IA in the energizing circuit of electrovalve S2, while said microswitches C3 and C4 are series connected with one another and with a microswitch C6 in the energizing circuit 122 of electrovalve S6, said microswitch C6 being able to reveal the return of feeding mechanism 36-40 of said programming drum 26. The operating condition of said mechanism 36-40 is revealed by a microswitch C5 which closes the circuit 130 wherefrom the energizing circuit 134 of electrovalve S5 and the energizing circuit 136 of electrovalve S1 are connected in parallel as in 132, said electrovalve S1 being series-connected with a normally closed setting switch IZ. The switch IA is closed by the tool at the end of a machining cycle.

The operation of said system is essentially as follows: The device is assumed to be in its operating condition as shown in FIG. 1 or 4; wherein said pushers 20 and 22 are forced against a positioning projection 24 by means of pressurized fluid in the circuit 105, while the tool operates and said starting switch IA is open. All electrovalves are deenergized, since the circuit 120, as closed by the electroswitches C1 and C2, is open at IA and the circuit 122, as closed at C6, is open at C3 and C4, said circuits 136 and 134 being also open, since the circuit 130 is open at C5.

At the end of a machining step (when the tool is brought away from the workpiece), the switch IA is closed and a positioning cycle is started. The temporary closure of said switch IA results in an energization of S2 through C1, C2 and IA, whereby the circuit 105 is vented and the circuit 104 is fed with pressurized fluid in order to drive said pushers away from each other.

At the end of said motion, the microswitches C3 and C4 (which, being series-connected, ensure that the end of return stroke is attained by both pushers) are closed and S6 becomes energized through C3, C4, C6, whereby a pressure is applied to the circuit 110 of cylinder 40. The programming drum 26 is then caused to perform a rotary step in order to place a new projection 24 between the pushers. The completion of said step is revealed by the closure of C5, which results in an energization both of S5, through the circuits 130 and 134 (whereby said cylinder 40 is vented), and of S1 through 130, IZ and 136, whereby 104 is again vented and 105 is connected to the pressure side so that said new projection 24 is tightly clamped between the pushers. The device is kept waiting for a next operating cycle, which will start upon the subsequent closure of IA, while a machining step is performed on the workpiece placed in its new position, and so on.

The device comprises means designed to keep it in a condition wherein its pushers are kept spaced apart (see FIG. 3). Such condition can be established by opening a setting switch IZ, whereby S1 is prevented from being re-energized.

The performances and advantages of the improved device according to this invention are apparent from the above description and accompanying drawings. By appropriately placing said projections 24 in the axial direction of drum 26, the workpiece (or the tool) can be automatically positioned in a required position along a straight segment having a useful length Lu (see FIG. 1), as allowed by the device design. By suitable pre-setting a set of projection carrying strips of components 124 (see FIGS. 5, 7 and 8) in a required order all around said positioning and programming drum, the device can be pre-set for any program of successive positioning steps in a number consistent with that— which may be even very great—of projections that can be pre-set on said drum, i.e. the number of angular displacements that can be imparted to drum 26 to accomplish a complete revolution (360°), after which the programmed cycle is re-started.

Figure 10:
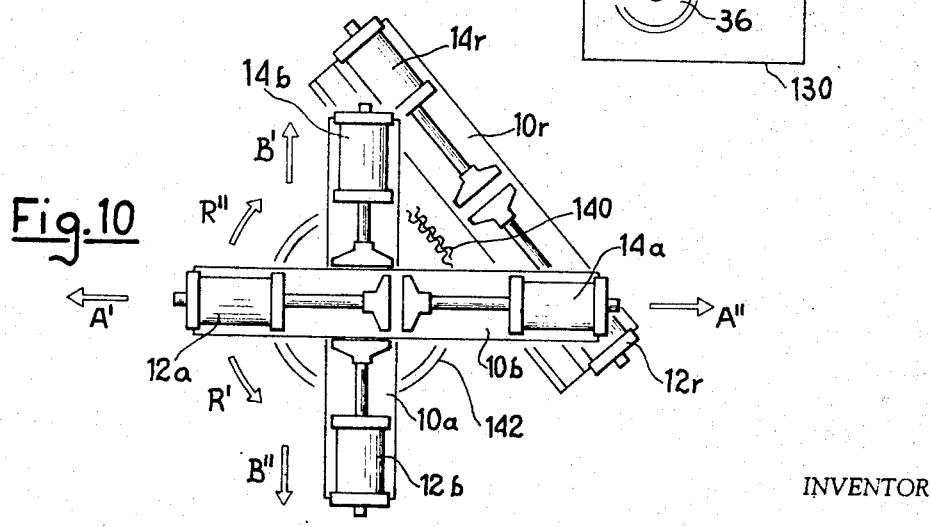
FIG. 10 is a diagrammatic plan view showing a plurality of devices according to this invention, suitably associated for carrying out complex positioning operations.

As previously stated, when more than one of the above described or equivalent devices are available, complex programmed positioning steps in two or more directions can be carried out. As diagrammatically shown in FIG. 10, a device comprising positioning cylinder-piston assemblies 12a, 14a (in addition to all other mechanisms as specified above) for carrying-out positioning steps in either directions A' and A'' can be supported in such a manner as to be moved in a direction orthogonal (or even at an angle other than 90°) to the direction as defined by A'-A'', e.g. in a direction B'-B'', by another similar device comprising cylinder-piston assemblies 12b and 14b. In such a manner positioning steps in any point of a bidimensional space, as defined by cartesian coordinates, having axes corresponding to said positioning directions of the two devices, can be obtained.

Both devices or the workpiece clamping structure, can be, in turn, revolvingly fitted about an axis orthogonal to the plane as defined by said directions A'-A''and B''-B', while a third device, comprising cylinder-piston assemblies 12r and 14r and acting on the former devices or clamping structure e.g. by means of a rack and pinion gear 140, 142, allows to impart programmed rotary motions in either directions R' and R'' about said axis, e.g. to bring the workpiece in a given direction and to preset the same for machining operations in pre-established directions, e.g. for drilling elongated holes, milling grooves, welding operations and the like. Further combinations and associations of the improved means according to this invention are obviously possible and will be made apparent to the skilled in the art, according to different programmed machining operations, all such combinations and associations being included in the scope of this invention.

I claim:

1. A device for successively positioning a workpiece to be machined in a number of positions in a pre-established sequence with respect to at least one tool, comprising a stationary support structure, a movable assembly for traversing a pre-established rectilinear path of travel relative to said support structure, said movable assembly comprising a support member, a pair of fluid powered means secured to said support member and arranged to move in the direction of said pre-established path of travel in opposite directions relative to one another, a pusher positioned on the end of each of said fluid powered means which is located closer to the adjacent end of the other said fluid powered means, said fluid power means being movable in opposite directions away from one another to a position forming a maximum interval between said pushers located on their adjacent ends, a positioning and programming means for selectively locating said support member comprising a movable positioning member, a plurality of similarly sized projections mounted in spaced relationship on said positioning member and selectively positionable into the path of said fluid powered means for spacing said pushers thereon at a minimum interval corresponding to the dimension of said projections measured in the direction of said pre-established path of travel, so that when said pushers are moved into contact with one of said projections located therebetween, then said member is displaced in said pre-established path of travel corresponding to the position of said projection disposed between and in contact with said pushers.

2. A device, as set forth in claim 1, wherein said movable positioning member comprises a cylindrically shaped drum mounted for rotation about an axis extending in parallel relationship with said pre-established path of travel, said projections being mounted on and extending outwardly from the periphery of said drum with each of said projections being mounted on a different generatrix of said drum with said generatrices of said drum supporting said projections being equidistantly spaced apart, said drum being mounted on said stationary support structure, and means operatively engaged with said drum for imparting to it a stepped rotary motion wherein the extent of each stepped rotary motion is equal to the angular width between said generatrices of said drum supporting said projections.

3. A device, as set forth in claim 2, wherein said projections on said drum are spaced apart in the direction of the axis of said drum in such a manner that the interval between said projections located on adjacent generatrices of said drum is not greater than the maximum distance travelled by one of said pushers as it is retracted from engagement with one of said projections and moved into the position of its maximum interval from the other said pusher.

4. A device, as set forth in claim 2, wherein said means for rotating said drum comprises a unidirectional rotary mechanism and said mechanism including means for imparting individual stepped rotary motion to said drum the angular width of which is equal to the spacing between adjacent said generatrices on said drum.

5. A device, as set forth in claim 2, wherein said drum has a number of grooves formed therein extending along said generatrices on which said projections are located, strip-like components replaceably inserted and secured within said grooves in said drum and said projections being positioned on said strip-like components.

6. A device, as set forth in claim 1, wherein each of said fluid powered means comprises a double acting cylinder-piston assembly, each of said cylinder-piston assemblies including a piston rod extending from the adjacent ends thereof, and said pushers secured to the ends of said piston rods extending outwardly from said cylinder-piston assemblies.

7. A device according to claim 4, wherein said unidirectional rotary mechanism comprises, as operating means, a fluid powered cylinder-piston assembly.

8. A device, as set forth in claim 6, including a pressure fluid source, control means comprising valve and flow distributor means connected to said pressure fluid source and said cylinder-piston assemblies for connecting said fluid source and said cylinder-piston assemblies in an alternating and preset manner and for venting said cylinder-piston assemblies and said fluid source.

9. A device, as set forth in claim 7, including a pressure fluid source, control means comprising valve and flow distributor means connected to said pressure fluid source and said cylinder-piston assemblies for connecting said fluid source and said cylinder-piston assemblies in an alternating and preset manner and for venting said cylinder-piston assemblies and said fluid source.

10. A device, according to claim 8, wherein said control means comprises electrovalves for controlling said cylinder-piston assemblies for carrying out a programmed sequence of connections, switches, electrovalve energizing electric circuits controlled by said switches, contactor and feeler means arranged to operate said switches and to react to and reveal the end of said piston rod movements in each of the end stroke of said piston rod positions, said electric circuits comprising follow-up and consent linkages for returning said pushers into the position contacting one of said projections only after said drum has been rotated and another said projection has been located between said pushers.

11. A device, as set forth in claim 10, wherein at least one switch is arranged to be interlocked with tool motions and operations, said switch being connected with said electric circuits so that said pushers can be moved from their position contacting one of said projections only after the tool has been displaced from a position relative to the workpiece where it cannot interfere with subsequent positioning steps.

12. A device according to claim 11, wherein the movement and action sequence to attain any next workpiece position is started by said switch interlocked with tool movements and actions.

13. A device according to claim 10, wherein said switches interlocked with the movements of said cylinder-piston assembly powered components are connected into said electric circuits in such a manner that the end of each movement starts a next movement within said positioning sequence.

* * * * *

UNITED STATES PATENT OFFICE
CERTIFICATE OF CORRECTION

Patent No. 3,704,956　　　　　　　Dated December 5, 1972

Inventor(s) EMILIO POSS

It is certified that error appears in the above-identified patent and that said Letters Patent are hereby corrected as shown below:

In the heading of the patent, the number of the Italian application should read

--23196 A/70--

Signed and sealed this 1st day of May 1973.

(SEAL)
Attest:

EDWARD M. FLETCHER, JR.　　　　　ROBERT GOTTSCHALK
Attesting Officer　　　　　　　　Commissioner of Patents